United States Patent [19]

Duncan, Jr.

[11] Patent Number: 5,587,354
[45] Date of Patent: Dec. 24, 1996

[54] DRILLING FLUID AND DRILLING FLUID ADDITIVE

[75] Inventor: William M. Duncan, Jr., Nueces County, Tex.

[73] Assignee: Integrity Industries, Inc., Kingville, Tex.

[21] Appl. No.: 233,501

[22] Filed: Apr. 26, 1994

Related U.S. Application Data

[63] Continuation of Ser. No. 142,953, Oct. 29, 1993, abandoned, which is a continuation of Ser. No. 950,491, Sep. 25, 1992, abandoned.

[51] Int. Cl.$^6$ ............................................. C09K 7/02
[52] U.S. Cl. ................................................... 507/137
[58] Field of Search ........................................... 507/137

[56] References Cited

U.S. PATENT DOCUMENTS

| | | | |
|---|---|---|---|
| 3,819,737 | 6/1974 | Kubitz | 260/675.5 |
| 4,409,108 | 10/1983 | Carney et al. | 507/137 |
| 5,085,695 | 2/1992 | Randen et al. | 106/8 |
| 5,204,016 | 4/1993 | Hamilton et al. | 252/162 |

*Primary Examiner*—Philip Tucker
*Attorney, Agent, or Firm*—G. Turner Moller

[57] ABSTRACT

A drilling fluid additive comprises a monocyclic terpene, preferably d-limonene or dipentene, a bycyclic terpene such as 3-carene, or mixtures thereof and an oil such as mineral oil or vegetable oil. The additive is mixed in a water based drilling mud in the range of 1–8% by volume. The additive has a number of advantages, particularly improved penetration rate, high lubricity and low toxicity.

10 Claims, No Drawings

DRILLING FLUID AND DRILLING FLUID ADDITIVE

This is a continuation of application Ser. No. 08/142,953, filed Oct. 29, 1993, now abandoned which is a continuation of application Ser. No. 07/950,491, filed Sep. 25, 1992, now abandoned.

This invention relates to a drilling fluid and a drilling fluid additive.

Drilling fluids used to drill wells into the earth are commonly called drilling muds because the original drilling fluid was simply water that mixed with clays in the earth to produce a thin mud. Typically, drilling mud is pumped down the drill string, through nozzles in the end of the bit and then upwardly in the annulus between the drill string and the wall of the bore hole. Drilling mud has a variety of functions and must accordingly have comparable capabilities. Cuttings generated by the bit are moved away from the bottom of the hole and then upwardly through the annulus to the surface to present a clean rock face to be drilled. The bit is cooled and lubricated by the drilling mud. The pressure of fluids in the formations penetrated by the bit is counterbalanced, or at least partially so, by the hydrostatic weight of the mud column in the hole. The drilling mud is modified to prevent undue effects on the bore hole wall, e.g. shale swelling. In water based muds, materials are added to prevent undue water loss into permeable formations penetrated by the bit. Various materials are added to reduce friction between the drill string and the bore hole wall. Those skilled in the art realize an almost endless list of substances have been added to drilling mud for a variety of reasons.

It is known in the art to add a monocyclic terpene, specifically d-limonene or dipentene, to drilling mud as an aromatic agent to mask the smell of some of the other ingredients, as shown in U.S. Pat. No. 4,409,108. Limonene or d-limonene is commercially obtained from distilling the oil generated from squeezing orange peels and is a well known and powerful fragrant. D-limonene is an oily material and is not substantially soluble in water. D-limonene is widely used as a fragrant, a solvent and a defoamer in a variety of industrial and household cleaning compositions far removed from the oilfield. See U.S. Pat. Nos. 4,511,488 and 4,620,937 as exemplary. Any cleaning product that smells of orange peel can be reliably taken to contain d-limonene.

The correct chemical name for d-limonene is 1,8-p-menthadiene or 4-isopropenyl-1-methylcyclohexene as stated on page 19 of Nomenclature for Terpene Hydrocarbons, American Chemical Society, Washington, D.C., published March 1955, although the name is often written as 1,8(9) p-menthadiene.

Dipentene is a common name for a closely related cousin of d-limonene. The correct chemical name for dipentene is 1,8-p-menthadiene (dl form) as stated on page 95 of Nomenclature for Terpene Hydrocarbons. D-limonene is an optically active 1,8-p-menthadiene obtained from oil peel squeezings and dipentene is a nonoptically active 1,8-p-menthadiene obtained from turpentine. For all practical purposes relating to this invention, d-limonene and dipentene are identical.

Applicant's first experience with d-limonene were laboratory tests resulting in a proposal to use it as a solvent for an oil spill cleanup. Applicant's assignee first sold d-limonene in March 1991 for use in horizontally drilled Austin Chalk wells in the Pearsall area of southwest Texas following reports that others were using pumping batches of mostly d-limonene downwardly through drill pipe and then upwardly in the annulus in an attempt to break oil-water emulsions. The first product was a modification of an existing surfactant based lubricant known as SURF-LUBE to which 10% by volume d-limonene was added, on the theory that the d-limonene would act as a defoamer and deemulsifier and overcome a natural tendency of surfactant additives to foam. This product was injected in small doses into the mud pump inlet. It was immediately noticed that the penetration rate was significantly greater than when using the prior surfactant lubricant. Gradually, the percentage of d-limonene was increased to 80% by volume with the surfactant reduced to 20% by volume. Soon, d-limonene was present in the drilling fluid in a percentage of 1–3% by volume. This product was found to reduce surface tension of the drilling fluid, reduce torque and drag on the drill string, reduce differential sticking tendencies, reduce circulating pressure, reduce wear on equipment, reduce plastic viscosity and increase bit life in addition to increasing the penetration rate.

The drilling of horizontal Austin Chalk wells soon evolved to the condition where they were underbalanced, i.e. the hydrostatic weight of the column of drilling fluid is less than the bottomhole pressure of the formation. This underbalanced condition allows the production of formation fluids during drilling, which in the case of many horizontal Austin Chalk wells is oil. One problem noted with the d-limonene-surfactant mixtures was a tendency of oil produced to be emulsified with water, which was often brine, used as the liquid phase of the drilling fluid, despite the known property of d-limonene to act as a deemulsifier. The main reasons to increase the percentage of d-limonene in the drilling fluid were to determine if it would increase penetration rate or decrease emulsified oil. In fact, both occurred although oil emulsions tended to persist in less aggravating forms, even at higher percentages of d-limonene.

At the outset, it was thought that the increase in penetration rate was because of the lubricity of the d-limonene-surfactant mixture, which was outstanding as shown in Table I:

TABLE I

Lubricity Test Results

| | low pressure lubricity |
|---|---|
| 1. XCD, .5#/bbl | .21 |
| 2. 20–80 d-limonene-surfactant mixture | .09 |
| 3. Tricron DCS — a surfactant based lubricant | .15 |
| 4. HPHT Lube — a polypropylene glycol based lubricant | .19 |
| 5. Torque Ease — Kelco rotary lubricant | .20 |

XCD is a viscosifier, i.e. a polymer used to increase the viscosity of the water and is a substitute for bentonite. It is added to water to provide cutting carrying capability. All samples started with 10.0 pound per gallon brine. In sample 1, .5# per barrel of XCD was added. In samples 2–5, 3% by volume of the additive was added to 10.0 ppg brine to which .5# per barrel of XCD had been added. All samples were mixed for 15 minutes. All samples were hot rolled for 16 hours. This was a blind test done by Randal Labs of Lafayette, Louisiana.

Because the d-limonene-surfactant increased the lubricity of the drilling fluid, it was thought that more weight was being applied to the bit and less lost due to friction with the well bore. In time, it dawned that something more was going on and that d-limonene was affecting penetration rate for some unappreciated reason because the increase in penetration rate was greater than should be expected by the increase in weight on the bit. Upon study and reflection, it appears the d-limonene acts as a solvent to clean the bit of cuttings, particularly shale or other gummy material because the increase in penetration rate was most noticeable when drilling in shaley or marly formations above the Austin Chalk and in areas where difficult shale sections exist.

To test this concept, a 50–50 mixture of d-limonene and mineral oil was added to a drilling fluid comprising mainly salt water at about 3% by volume, the idea being that the mineral oil would act as a lubricant in place of the surfactant. The first dramatic observation was there was no emulsion formed of the produced oil and the additive. The second observation was that penetration rates improved again. Although not wishing to be bound by any theory, it appears that improved penetration rates are seen because the dispersed droplets of d-limonene in the drilling fluid clean the bit and the dispersed droplets of mineral oil preferentially wet the bit and thereby help keep it clean.

A major advantage of a water based drilling fluid using d-limonene and a vegetable or mineral oil mixture is the additive is not considered toxic or environmentally hazardous so neither the used drilling fluid nor any cuttings generated during drilling require special handling.

In one aspect, this invention comprises a water based drilling fluid comprising 1–8% of a monocyclic or bicyclic terpene, or mixtures thereof, and an oil selected from the group consisting of vegetable oil, mineral oil and mixtures thereof. Specifically, the monocyclic terpene is preferably d-limonene, dipentene or mixtures thereof.

In another aspect, this invention comprises an additive for a water based drilling fluid comprising a mixture of a monocyclic terpene, a bicyclic terpene or mixtures thereof and an oil selected from the group consisting of vegetable oil, mineral oil and mixtures thereof.

It is an object of this invention to provide an improved water based drilling fluid incorporating a monocyclic terpene, a bicyclic terpene or mixtures thereof.

Another object of this invention is to provide an improved additive for water based drilling fluids incorporating a monocyclic terpene, a bicyclic terpene and mixtures thereof.

These and other objects of this invention will become more fully apparent as this description proceeds.

The drilling fluid of this invention is water based, either fresh water or brine, and may have therein a variety of additives for a variety of different purposes, most of which will be recognized by those skilled in the art. As a general rule, water based drilling fluids include a viscosifier to make the liquid thick enough to carry cuttings, a water loss control material to reduce the loss of water in the drilling fluid to permeable formations encountered in the well, pH control materials for increasing the pH of the drilling mud and thereby reducing shale swelling, weight material for increasing the density of the drilling fluid and thereby increasing the hydrostatic weight of a column of the drilling fluid to control the pressures of the formations encountered and a variety of specialized additives such as lubricants or other specialized materials.

The standard viscosifier used in drilling muds is bentonite which is often called gel. Other materials, such as the polymer known as XCD shown in Table I, are also commonly used. Bentonite is a naturally occurring swellable clay and has been used for decades as the standard viscosifier in drilling muds. The purpose of raising the viscosity is to enable the drilling fluid to carry cuttings upwardly in the hole. Another advantageous side effect of bentonite as a viscosifier is that when the mud is quiescent, it forms a thick gel or semi-solid from which cuttings do not readily fall out.

There are many water loss control materials used or suggested for use in drilling fluids. Bentonite has a water loss control capability, to a point, because the swollen clay particles are swept onto the face of a permeable formation by escaping water to produce a soft, gummy filter cake which somewhat retards water loss into a permeable formation. Powdered lignite, sodium polyacrylates, sulfonated asphalt, polyanionic cellulose and other materials have long been used as water loss control materials. When added in proper proportions to a water based, bentonite mud system, the water loss to permeable formations can be reduced to tolerable amounts.

It is normally desirable that the drilling mud have a high pH to control shale swelling and other reasons. Caustic soda is almost universally used for this purpose.

The standard weight material used in drilling muds is powdered barite which is barium sulfate. Hematite or iron oxide is also used in some circumstances. Unweighted mud systems typically exhibit a density of about 9.5 pounds/gallon or less, up from 8.3 pounds/gallon for fresh water. The increase in density is largely caused by small cuttings being suspended in the drilling mud. To achieve mud densities above about 9.5 pounds/gallon, weight material is added.

The additive of this invention and its predecessors fall into a category of specialized materials that are added to water based drilling fluids for a variety of more subtle reasons than those mentioned above. Even though more subtle, the effects can be dramatically important.

EXAMPLE 1

In a Frio County, Tex. horizontal Austin Chalk well, the torque and drag increased as the 90° angle was built. It became increasingly difficult to continue drilling without getting the drill pipe stuck. The addition of 1% by volume ULTRA-LUBE containing a 80-20 mixture of d-limonene and surfactant lowered the torque and drag significantly and allowed progress to continue until the well was successfully drilled with a horizontal leg of 2000'.

It was later learned that d-limonene and surfactant tended to produce emulsions.

EXAMPLE 2

In a Webb County, Tex. vertical well, the penetration rate was averaging 14 feet/hour at 7000'. The addition of 3% by volume ULTRA-LUBE containing a 75-25 mixture of d-limonene and soybean oil resulted in the average rate of penetration increasing to 57 feet/hour with a maximum rate exceeding 120 feet/hour.

EXAMPLE 3

In a Webb County, Tex. vertical well, a 70-20-10 mixture of d-limonene, soybean oil and mineral oil was used instead of an oil based mud due to the cost of disposing of oil contaminated cuttings. The interval at approximately 7000–9000' was the first in the field to be drilled with a water based mud. There was naturally great concern about slow penetration rates, formation damage, stuck pipe and washout of the well bore. The mixture of d-limonene, soybean oil and mineral oil was added at 3% by volume to an otherwise conventional lignosulfonate mud system. The well was drilled at an average penetration rate exceeding 60 feet/hour with some parts of the interval drilling at over 100'/hour. This was a record rate for the field. No abnormal torque or drag was experienced and the well was drilled to gauge with a 6¾" bit with no evidence of washout or formation damage. The operator decided to convert all infield drilling to a water based mud system using a d-limonene-oil additive.

EXAMPLE 4

In a Webb County, Tex. well, a water based lignosulfonate mud system was used with 4% by volume of a 60-40 mixture of d-limonene and rice oil. The well was successfully drilled to a total depth of 9500' with the average rate of penetration exceeding 60'/hour below 7000'. The well bore was drilled to gauge and no problems were experienced. The average cost per foot of the well attributed to the drilling fluid was lower than any other wells drilled in this area with an oil based mud.

In a qualitative way, the effect on mud properties and drilling rate from the following examples of lubricant formulations added at 3% by volume in a weighted water based mud system are instructive.

TABLE II

| 100% surfactant | |
| --- | --- |
| Lubricating properties | excellent |
| Coating properties | excellent |
| Forms emulsions | yes |
| Increase in rate of penetration | moderate |
| 50% surfactant, 50% d-limonene | |
| Lubricating properties | excellent |
| Coating properties | excellent |
| Forms emulsions | yes |
| Increase in rate of penetration | high |
| 100% vegetable oil or mineral oil | |
| Lubricating properties | excellent |
| Coating properties | moderate |
| Forms emulsions | no |
| Increase in rate of penetration | moderate |
| 50% vegetable oil 50% d-limonene | |
| Lubricating properties | excellent |
| Coating properties | excellent |
| Forms emulsions | no |
| Increase in rate of penetration | extremely high |

As will become more fully apparent hereinafter, it is believed that the addition of a monocyclic terpene, such as d-limonene, a bicyclic terpene, such as 3-carene which is often known by the common name of delta-3-carene, and an oil based lubricant is effective to increase penetration rate. One possible explanation is the terpene cleans the bit and the lubricant wets the bit and thereby retards shale from clinging to it. Thus, it is surprising that a mixture of d-limonene and oil is more effective to coat a metal object than the oil alone. As used in these tables, the mixtures were prepared and a metal object dipped in the mud. If the mud runs off and does not cling to the metal, the coating properties are deemed excellent.

The drilling fluid additive of this invention is a mixture of one or more cyclic terpenes and an oil. The terpene may be monocyclic, preferably d-limonene, dipentene or mixtures thereof. These materials are readily commercially available. Other monocyclic terpenes are also effective, such as p-menthane, p-cymene, 2-p-menthane, 4,(8)-p menthane, 1,3-p-menthadiene, 2,4-p-menthadiene, 1(7),8-p-menthadiene, 2,8-p-menthadiene, 3,8-p-menthadiene and 1(7),2-p-menthadiene. The cyclic terpene may be bicyclic, such as carane, 2-carene, 3-carene (also known as delta-3-carene) and 3(10)-carene. The oils used in the drilling fluid additive are selected from the group consisting of mineral oil, vegetable oil and mixtures thereof. The preferred oil is soybean oil. A typical suitable mineral oil is known as mineral seal oil and is commercially available under that name. Other suitable mineral oils are Exxon Escaid 110 and Conoco LVT oil. Many different vegetable oils are acceptable, other than soybean oil, such as rice oil, castor oil, cottonseed oil, rape seed oil, sunflower oil and canola oil.

The cyclic terpene is used as a substantial percentage of the additive, at least 30% by volume, preferably 50% by volume and up to about 95% by volume. Although most of the balance of the additive is the oil, other materials may also be employed, such as dyes, fragrants if it is desired to mask the odor of fragrant terpenes or if a non-fragrant terpene is used, and the like.

Preferably, the additive of this invention is simply poured or injected into a more-or-less conventional drilling mud. When added to a water based drilling fluid, the additive is present in an effective amount in the range of 1–8% by volume. The performance of the mud system is monitored to use the least amount of the additive commensurate with effectiveness. Usually, the amount of additive lies in the range of 1–3% by volume.

In some circumstances it may be desirable to add the cyclic terpene and oil separately, e.g. to adjust the percentages of the components in the mud system without packaging a wide variety of compositions. This may be desirable even though there are manifest problems controlling the exact proportions under field conditions.

The following examples are also representative of this invention.

EXAMPLE 5

The preferred drilling additive is 50% by volume d-limonene and 50% by volume soybean oil. These materials are soluble and equal amounts are mixed and poured into a convenient container usually a 5 gallon can or a 55 gallon drum. The drilling additive is added to a water based drilling mud so the additive constitutes 3% by volume of the drilling mud. The drilling mud weighed 14 pounds/gallon, had a pH of 10.5, and a water loss of 7.2 cc.

In one situation with this additive, the penetration rate increased from 22 feet/hour to an average of 57 feet/hour.

EXAMPLE 6

A mixture of 30% by volume d-limonene and 70% by volume soybean oil is added at 5% by volume to a conventional water based mud. The mud weighed 13.5 #/gallon, had a pH of 9.5 and a water loss of 6.0 cc.

EXAMPLE 7

A mixture of 70% by volume d-limonene, 15% by volume soybean oil and 15% by volume of mineral oil is added at 3% by volume to a conventional water based mud. The mud weighed 14.0 #/gallon, had a pH of 10.0 and a water loss of 10.4 cc.

EXAMPLE 8

A mixture of 90% by volume d-limonene and 10% soybean oil was added to a conventional water based mud at 2% by volume.

EXAMPLE 9

A mixture of 50% by volume Exposol 100 and 50% by volume soybean oil was added to a conventional water based mud at 4% by volume. The mud weighed 9.5 pound/gallon having a pH of 11.5, viscosity of 45 and water loss of 9 cc. Exposol 100 is a proprietary mixture of terpenes available from Expo Chemical Company, Inc. of Cypress, Tex. having a Kaun-Butanol value of 60. Available information suggests the mixture includes acyclic, monocyclic and bicyclic terpenes of which delta-3-carene, which is a bicyclic terpene, is a substantial component. A drilling test showed no substantial drilling difference between an additive containing Exposol 100 and a similar additive containing d-limonene.

EXAMPLE 10

A mixture of 50% by volume of Product S105 and 50% soybean oil was added at 2% by volume to a conventional water based mud. Product S105 is commercially available from Expo Chemical Company, Inc. of Cypress, Tex. and is a minimum of 70% by volume delta-3-carene and a balance of other terpene hydrocarbons.

It is believed that a mixture of terpenes and oil are desirable for use as additives to water based muds because the dispersed terpene droplets tend to clean the bit and the dispersed oil droplets tend to coat the bit so shale or other gummy material does not cling to it. Terpenes are oily liquids and tend to be good solvents. A standard technique of measuring solvency in terpenes is the Kaun-Butanol test in which butanol is added drop-by-drop into a fixed quantity of the solvent at a predetermined temperature. When the solvent becomes cloudy, the conclusion is the solvent is saturated and the number of added drops is the Kaun-Butanol, or KB, value. Acyclic terpenes tend to have very high KB values, monocyclic terpenes have intermediate KB values and bicyclic terpenes have lower but good KB values. Thus, it would appear the acyclic terpenes would be the best terpenes for mud additives, followed by monocyclic terpenes and then bicyclic terpenes. Acyclic terpenes are, however, much more reactive, i.e. they tend to polymerize and oxidize, than monocyclic terpenes which in turn are more reactive than bicyclic terpenes. This is seen in the field because monocyclic terpenes, such as d-limonene, tend to lose effectiveness after several round trips through the mud system while the bicyclic terpenes, such as delta-3-carene tend to retain their properties at high temperatures as shown in Table III.

TABLE III

|  | mud with no additive | Sample I d-limonene | Sample II 3-carene |
| --- | --- | --- | --- |
| Before static age test |  |  |  |
| plastic viscosity, cp | 26 | 20 | 20 |
| yield point, cp |  | 6 | 6 |
| coating properties |  | excellent | excellent |
| After static age test |  |  |  |
| plastic viscosity, cp |  | 29 | 20 |
| yield point, cp |  | 7 | 5 |
| coating properties |  | good | excellent |

An existing water based drilling mud had a plastic viscosity of 26. Sample I was created by adding 3% by volume of d-limonene. Sample II was created by adding 3% by volume of 3-carene. Both samples were subjected to a static age test in which the samples were heated to 350° F. at 500 psig for one hour. The plastic viscosity of a water based mud system normally declines after adding a lubricant. It is apparent that the plastic viscosity of the Sample I degraded during the static age test while that of Sample II did not. Other qualitative observations confirmed that the monocyclic terpene d-limonene degraded much more than the bicyclic 3-carene. The odor of Sample I changed from the normal pungent citrus peel smell to a faint, musty odor while the odor of Sample II was unchanged. Samples I and II were both shiny before the static age test and Sample I noticeably less shiny after the static age test. Sample II shed quickly off a metal object while Sample I was noticeably slower.

I claim:

1. A water based drilling fluid comprising water, a weight material, a viscosifier and 1–8% of (a) 30–95 parts by volume of a cyclic terpene and (b) 70-5 parts by volume of an oil selected from the group consisting of vegetable oil, mineral oil and mixtures thereof.

2. The drilling fluid of claim 1 wherein the cyclic terpene is selected from the group consisting of monocyclic terpenes, bicyclic terpenes and mixtures thereof.

3. The drilling fluid of claim 2 wherein the monocyclic terpene is d-limonene.

4. The drilling fluid of claim 2 wherein the monocyclic terpene is dipentene.

5. The drilling fluid of claim 2 wherein the monocyclic terpene is p-menthane.

6. The drilling fluid of claim 2 wherein the monocyclic terpene is p-cymene.

7. The drilling fluid of claim 2 wherein the bicyclic terpene is 3-carene.

8. The drilling fluid of claim 2 wherein the monocyclic terpene is selected from the group consisting of d-limonene, dipentene, p-menthane, p-cymene, 2-p-menthane, 4,(8)-p menthane, 1,3-p-menthadiene, 2,4-p-menthadiene, 1(7),8-p-menthadiene, 2,8-p-menthadiene, 3,8-p-menthadiene and 1(7),2-p-menthadiene and mixtures thereof.

9. The drilling fluid of claim 1 wherein the weight material is selected from the group consisting of barium sulphate and hematite.

10. The drilling fluid of claim 1 wherein the viscosifier is selected from the group consisting of bentonite and polymer.

* * * * *